US010069657B2

(12) United States Patent
Johnson et al.

(10) Patent No.: US 10,069,657 B2
(45) Date of Patent: *Sep. 4, 2018

(54) LOW POWER EQUALIZER AND ITS TRAINING

(71) Applicant: Intel Corporation, Santa Clara, CA (US)

(72) Inventors: Luke A. Johnson, Queen Creek, AZ (US); Sleiman Bou-Sleiman, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,996

(22) Filed: May 22, 2017

(65) Prior Publication Data

US 2018/0006848 A1 Jan. 4, 2018

Related U.S. Application Data

(63) Continuation of application No. 14/129,267, filed as application No. PCT/US2013/048284 on Jun. 27, 2013, now Pat. No. 9,660,842.

(51) Int. Cl.
*H04L 25/03* (2006.01)
(52) U.S. Cl.
CPC .. *H04L 25/03057* (2013.01); *H04L 25/03878* (2013.01)
(58) Field of Classification Search
CPC ................ H04L 25/03057; H04L 25/03878
USPC ........................................................ 375/233
See application file for complete search history.

(56) References Cited

U.S. PATENT DOCUMENTS

| 6,075,476 | A | 6/2000 | Johnson et al. |
| 6,184,732 | B1 | 2/2001 | Johnson et al. |
| 6,208,181 | B1 | 3/2001 | Johnson |
| 6,570,917 | B1 | 5/2003 | Lai et al. |
| 7,280,456 | B2 | 10/2007 | Brown et al. |
| 7,302,246 | B2 | 11/2007 | Tseng et al. |
| 7,501,863 | B2 | 3/2009 | Querbach et al. |
| 7,656,226 | B2 | 2/2010 | Johnson et al. |
| 7,974,174 | B2 | 7/2011 | Brown et al. |
| 9,660,842 | B2 * | 5/2017 | Johnson ............ H04L 25/03057 |
| 2008/0069191 | A1 | 3/2008 | Dong et al. |
| 2010/0329326 | A1 | 12/2010 | Aziz et al. |

(Continued)

FOREIGN PATENT DOCUMENTS

| WO | 2004010665 A2 | 1/2004 |
| WO | 2013141865 A1 | 9/2013 |

OTHER PUBLICATIONS

PCT International Search Report and Written Opinion for PCT/US2013/048284, dated Apr. 10, 2014, (7 pages).

*Primary Examiner* — Michael Neff
(74) *Attorney, Agent, or Firm* — Compass IP Law, PC

(57) ABSTRACT

Described is an apparatus which comprises: samplers operable to perform linear equalization training and to perform function of an un-rolled decision feedback equalizer (DFE); and logic to select output of offset samplers, from among the samplers, when two adjacent bits of an input signal are the same. Described is an equalization scheme which comprises a linear equalizer (LE) operable to match a first post-cursor residual ISI tap to a first pre-cursor residual ISI tap for a non-lone bit transition of the input signal.

17 Claims, 9 Drawing Sheets

(56) References Cited

U.S. PATENT DOCUMENTS

2012/0257652 A1 10/2012 Malipatil et al.
2014/0204990 A1 7/2014 Song et al.
2015/0049798 A1 2/2015 Hossein et al.

* cited by examiner

LOW POWER EQUALIZER AND ITS TRAINING

CLAIM OF PRIORITY

This application claims the benefit of U.S. patent application Ser. No. 14/129,267 filed Dec. 24, 2013, titled "LOW POWER EQUALIZER AND ITS TRAINING" which further claims the benefit of International Patent Application No. PCT/US2013/048284 filed Jun. 27, 2013, titled "LOW POWER EQUALIZER AND ITS TRAINING," both which are incorporated by reference in their entirety.

BACKGROUND

For high speed serial Input-Output (I/O)s, e.g., Universal Serial Bus (USB) 3, to be able to deal with channels with over 20 dB of loss at Nyquist frequency, Decision Feedback Equalization (DFE) is added to the I/O receivers to correct for Inter-Symbol Interference (ISI) on analog input signals received by the I/Os. DFE is commonly implemented using a summer in a data path which adds offset to the analog input signal as a function of 'n' previous samples. DFE has the disadvantage of creating a speed path from the most recently sampled bit d[n] to influence the bit immediately following y[n+1], where y[n+1] is generated by the summer of DFE.

An alternative to DFE is loop-unrolled DFE (uDFE), where multiple samples are taken at two or more applied offsets and the decision on which value to use is postponed until later in the pipeline. uDFE eliminates the speed path observed by traditional DFE because knowing what the last data sample resolved to before sampling the next sample is no longer needed. However, uDFE is very impractical to implement for much over 1 bit feedback since $2^n$ samplers are required for 'n' bits (also called 'n' taps) of feedback. 4-tap uDFE, for example, may require 16 samplers to implement in a loop-unrolled fashion which dramatically increases the power and area of the I/O design. Another disadvantage of DFE and uDFE is that they do not address pre-cursor ISI, which is a major source of error.

Overall as data rates increase, increasingly more equalization is required to recover the data. This comes at a power and area cost that conflicts with the aggressive power and cost budgets for handheld SoC (System-on-Chip) devices.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1A:
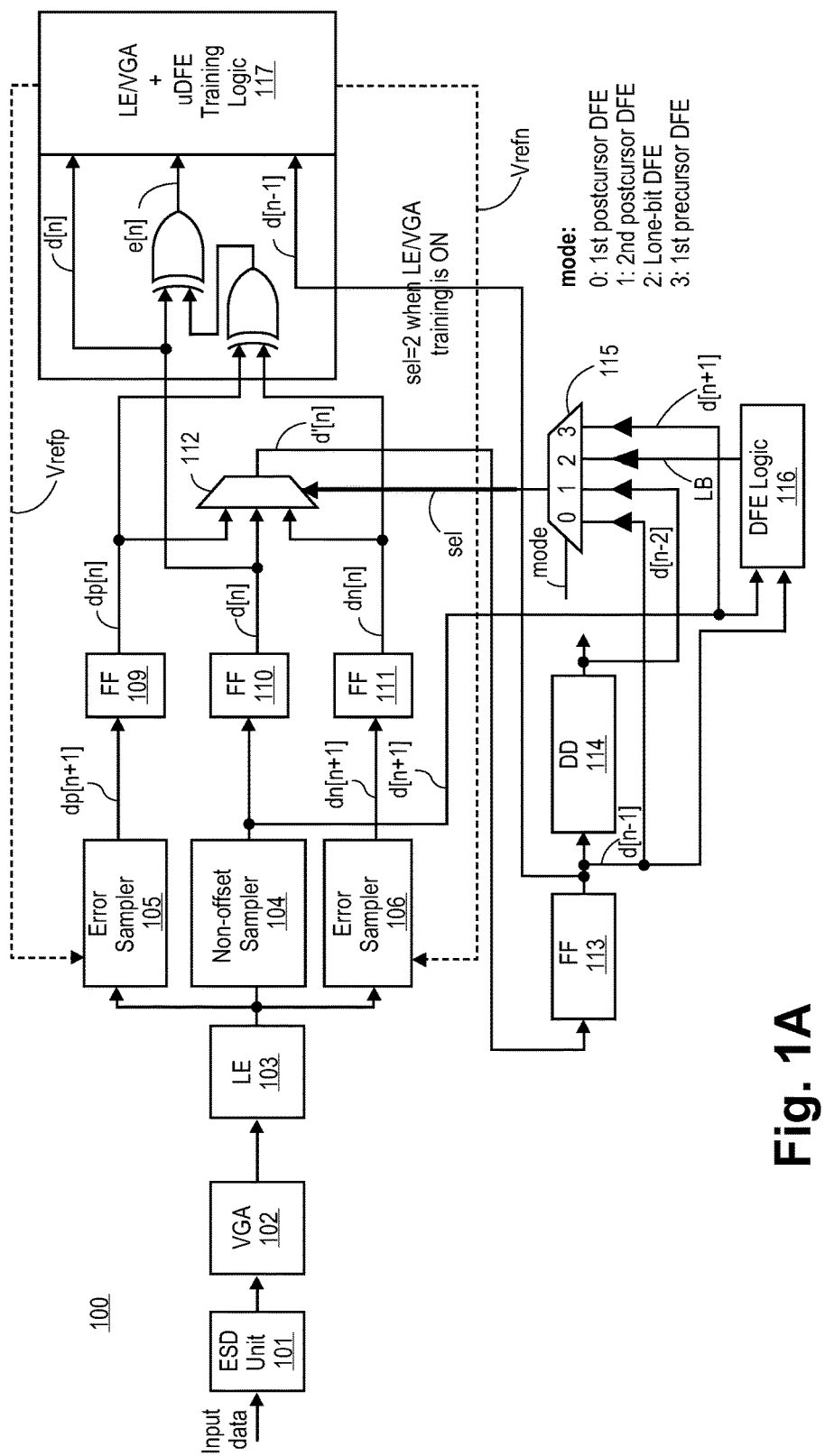
FIG. 1A is part of a receiver with a lower power equalizer, according to one embodiment of the disclosure.

The embodiments describe an equalizing scheme to perform equalization without the power and area impact that traditional approaches incur, which are discussed in the background section. Rather than adding full 4-tap DFE (Decision Feedback Equalization) to directly correct for post cursor channel losses, the embodiments use the existing error samplers in an IO (input-output) receiver and Linear Equalizer (LE) to effectively correct for the three largest taps.

Unlike traditional unrolled DFE solutions, the embodiments balance the pre-cursor tap against the post-cursor tap, which are the two largest taps (i.e., sources of error), so they cancel each other for non-lone bit transitions. In this condition, the N+2 tap is also substantially eliminated. In one embodiment, the existing error samplers, then, are utilized in a modified unrolled DFE (uDFE) fashion to address the lone-bit transitions in the received input signal.

Existing solutions for high speed IO channels (e.g., USB3, Peripheral Component Interconnect Express (PCIe), Serial ATA (SATA), etc.,) use 4-tap DFE to bring the N+2, N+3, and N+4 taps to zero and rely on some form of linear equalization for the N+1. N+1, N+2, N+3, and N+4 taps are post-cursor taps. A summer block is used in the traditional DFE to bring the N+2, N+3, and N+4 taps to zero. Summer blocks are challenging to develop and add both power and area to the IO design. Furthermore, traditional DFEs do not effectively address the N−1 pre-cursor tap which is the second largest error source in the channel. The embodiments effectively eliminate this N−1 pre-cursor tap as well as the N+1 and N+2 post cursor taps (the three largest error sources) resulting in better performance than traditional equalization schemes while consuming lower power and area than typical designs focusing only on post-cursor ISI correction.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFet transistors, Gate All Around Cylindrical Transistors or other devices implementing transistor functionality like carbon nano tubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1A is part of a receiver 100 with a lower power equalizer, according to one embodiment of the disclosure. The receiver 100 shows logic units associated with the embodiments. So as not to obscure the embodiments, all logic units of receiver 100 are not shown. For example, phase interpolator (PI), clock data recovery (CDR) unit, etc., are not shown. In one embodiment, receiver 100 comprises a pad (not shown), an electro-static discharge (ESD) unit 101, an amplifier 102, LE 103, data sampler 104, and corresponding error samplers 105 and 106, sequential units (e.g., flip-flops (FF)) 109, 110, 111, first multiplexer 112, sequential units 113 and 114, second multiplexer 115 (which may be optional), DFE logic 116, and training logic 117.

In one embodiment, the pad receives input data signal over a channel. In one embodiment, ESD unit 101 protects receiver circuits from any ESD event causing excessive overshoot or undershoots in the input data signal. In one embodiment, amplifier 102 amplifies the received input signal for processing by linear equalizer (LE) 103. In one embodiment, amplifier 102 can be removed and input signal can be directly received by LE 103. In one embodiment, output of LE 103 is sampled by samplers. In one embodiment, samplers include offset and non-offset samplers.

For example, error samplers 105 and 106 are offset samplers and data sampler 104 is a non-offset sampler. Offset samplers 105 and 106 allow adjustment of reference voltage to the samplers 105 and 106 by adding or subtracting an offset voltage from the reference voltage. In this embodiment, error sampler 105 has a positive offset (which in this example favors a low output) while error sampler 106 has a negative offset (which in this example favors a high output) i.e., error samplers 105 and 106 have opposite offsets. dp and dn are the digital outputs of the error samplers. dp and dn are used first to convey signal height information through e[n] for training purposes, then are used as DFE samples later on. In one embodiment, sampled data i.e., dp[n+1], d[n+1], and dn[n+1] are sampled by sequential units 109, 110, and 111 respectively, generating dp[n], d[n], and dn[n] samples.

In one embodiment, outputs of sequential units 109, 110, and 111 i.e., dp[n], d[n], and dn[n] are received by first multiplexer 112 which provide d'[n] to sequential unit 113. In one embodiment, first multiplexer 112 is controllable by select signal sel generated by output of second multiplexer 115. In one embodiment, output d[n−1] of sequential unit 113 is sampled by sequential unit 114 to generate d[n−2]. In one embodiment, logic 116 receives output d[n+1] from non-offset data sampler 104 and output d[n−1] from sequential unit 113 to generate inputs for second multiplexer 115. In one embodiment, second multiplexer 115 also receives inputs d[n−1] and d[n−2].

In one embodiment, second multiplexer 115 is controlled by mode signal to select a desirable uDFE mode. In this exemplary embodiment, if mode is 0 (i.e., 00), first post-cursor DFE is performed and d[n−1] is provided as select signal sel; if mode is 1 (i.e., 01), second post-cursor DFE is performed and d[n−2] is provided as select signal sel; if mode is 2 (i.e., 10), lone-bit DFE is performed signal LB is provided as select signal sel; and if mode is 3 (i.e., 11) first pre-cursor DFE is performed and d'[n+1] is provided as select signal sel. In one embodiment, mode 2 (i.e., lone-bit DFE) is selected. In one embodiment, modes 0, 1, and 3 are configurations that enable traditional uDFE options. In one embodiment, second multiplexer 115 is removed and select signal sel is connected directly to logic 116. For example, LB signal from logic 116 is used as select signal sel.

In one embodiment, training logic 117 is used to train LE 103, VGA 102 and uDFE. In one embodiment, current error e[n] is generated by exclusive-OR gates (two shown) which receives input d[n] from first FF 110, dn[n] from FF 111 and dp[n] from FF 109. In one embodiment, Vrefp and Vrefn are generated by training logic 117 to set threshold levels for error samplers 105 and 106, respectively. In one embodiment, training logic 117 sets Vrefp and Vrefn to set TSM level for training LE 103 and amplifier 102. In one embodiment, after training LE 103 and amplifier 102, training logic 117 adjusts Vrefp and Vrefn for uDFE training to compute ISI. In one embodiment, after uDFE training is complete, Vrefp and Vrefn are set at desired ISI correction voltage levels.

Most high speed IO receivers employ some amount of linear equalization. This linear equalization targets the N+1 ISI tap. DFE, then, can be employed to bring the remaining post-cursor taps to zero. However, traditional schemes of linear equalization followed by DFE leave pre-cursor (N−1) tap uncorrected. Even with small adjustment to pre-cursor tap by traditional linear equalization, large errors in the pre-cursor tap remain. The embodiment of FIG. 1 is realized by modifying a classical unrolled DFE scheme to reduce the error from all these major taps—N−1, N+1, and N+2.

In one embodiment, additional custom circuits are not added to implement the modified classical unrolled DFE scheme, but instead, error samplers 105 and 106 are re-purposed after linear equalization (LE) training. In one embodiment, a novel LMS (Least Mean Square) training and DFE selection algorithm are implemented by the logic blocks of FIG. 1 to minimize the impact of these three taps—N−1, N+1, and N+2.

In one embodiment, the blocks of FIG. 1 apply the following formula to drive pre-cursor and post-cursor taps to almost zero.

$$d'[n]=(d[n-1]==d[n+1])?(d[n-1]?dn[n]:dp[n]):d[n]$$

In one embodiment, DFE logic 116 block performs this selection computation and controls the select signal sel into multiplexer 112 to set d'[n] as one of the inputs to multiplexer 112, i.e. d[n], dp[n], or dn[n].

In one embodiment, data sampler 104 and error samplers 105 and 106 are utilized in a classical LMS training algorithm to establish the optimal setting for amplifier 102 and LE 103. In one embodiment, once this training is complete, the error samplers 105 and 106 are turned off to save power. In one embodiment, error samplers 105 and 106 are re-purposed to enable uDFE with various options including a combination of N−1, N+1, and/or N+2 taps selected through second multiplexer 115.

In one embodiment, logic 116 is used to select output of offset samplers 105 and 106, through the LB (lone bit) signal, when the two adjacent bits (i.e., d[n−1] and d[n+1]) to the current sample of the input signal (i.e., d[n]) are the same. In one embodiment, receiver 100 further comprises logic (e.g., logic 116) to select output of the non-offset sampler 104 when two adjacent bits of the input signal are different, also through the LB signal. In one embodiment, LB signal comprises a bus of two logic signals to control multiplexor 112. In one embodiment, receiver 100 further comprises logic 117 to set offset of offset samplers 105 and 106 (via reference signals Vrefp and Vrefn) to a sum of the first post-cursor residual ISI tap and the first pre-cursor residual ISI tap. In one embodiment, receiver 100 further comprises logic to tune offset of the offset samplers to maximize signal integrity of the received input signal.

Figure 1B:
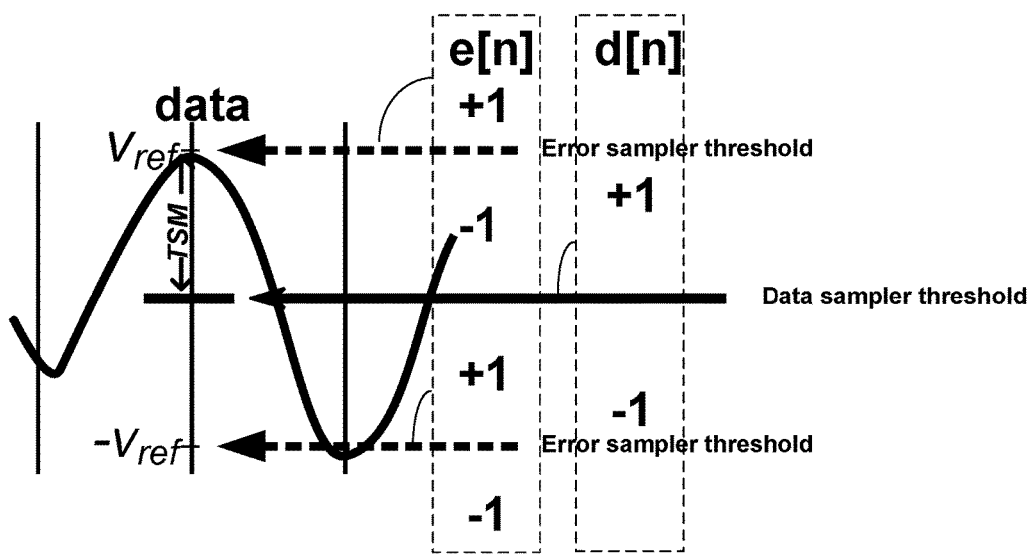
FIG. 1B illustrates error and data sampler thresholds.

FIG. 1B illustrates reference levels (or threshold levels) for data 104 and error samplers 105 and 106 relative to input data signal. It is pointed out that those elements of FIG. 1B having the same reference numbers (or names) as the elements of any other figure can operate or function in any manner similar to that described, but are not limited to such. Reference to error sampler 105 is Vref, reference to error sampler 106 is −Vref, and reference to data sampler 104 is 0 (also=Vref−TSM). The reference levels are also called slicers.

Figure 2:
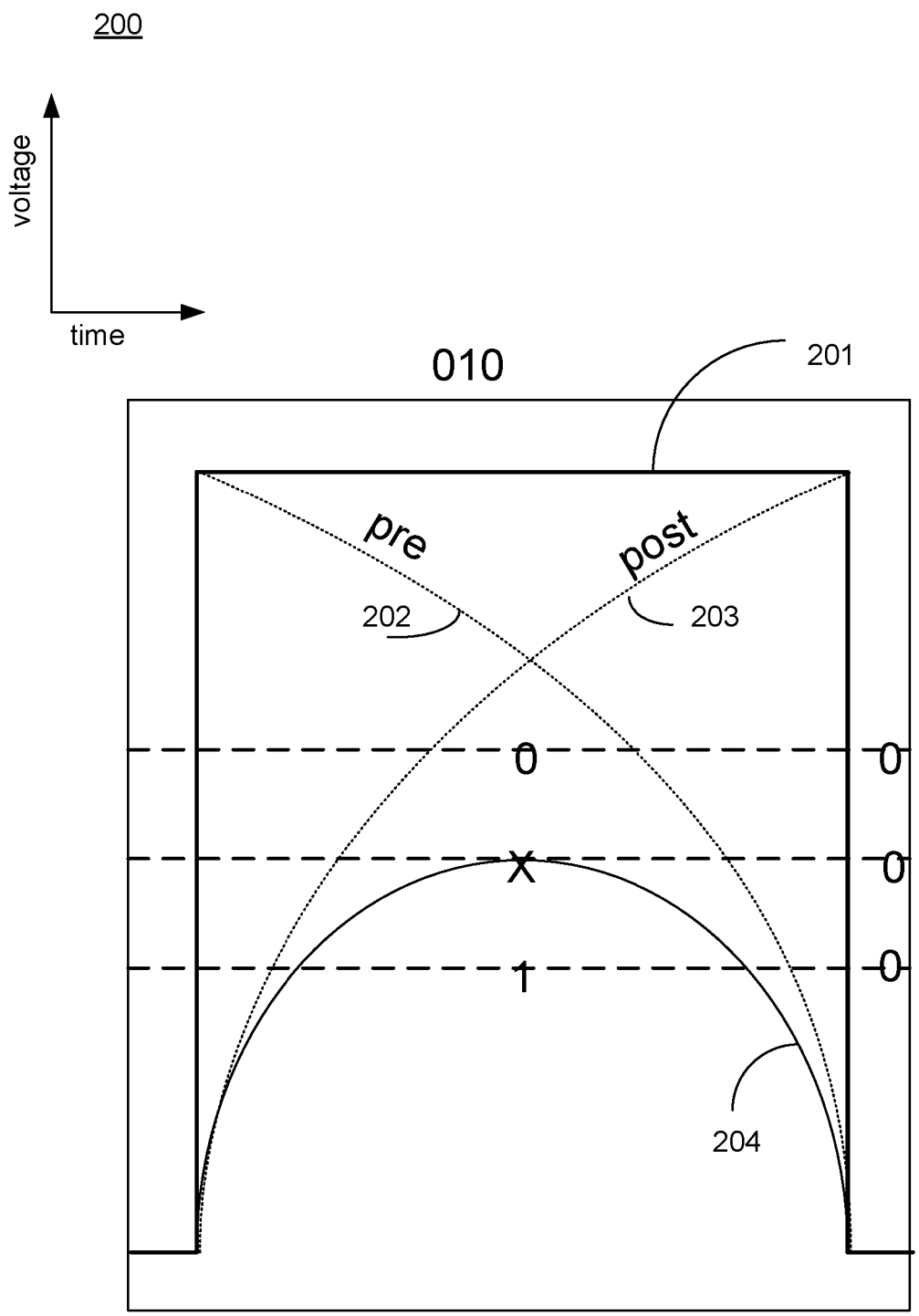
FIG. 2 is a closed lone bit transition.
Figure 3:
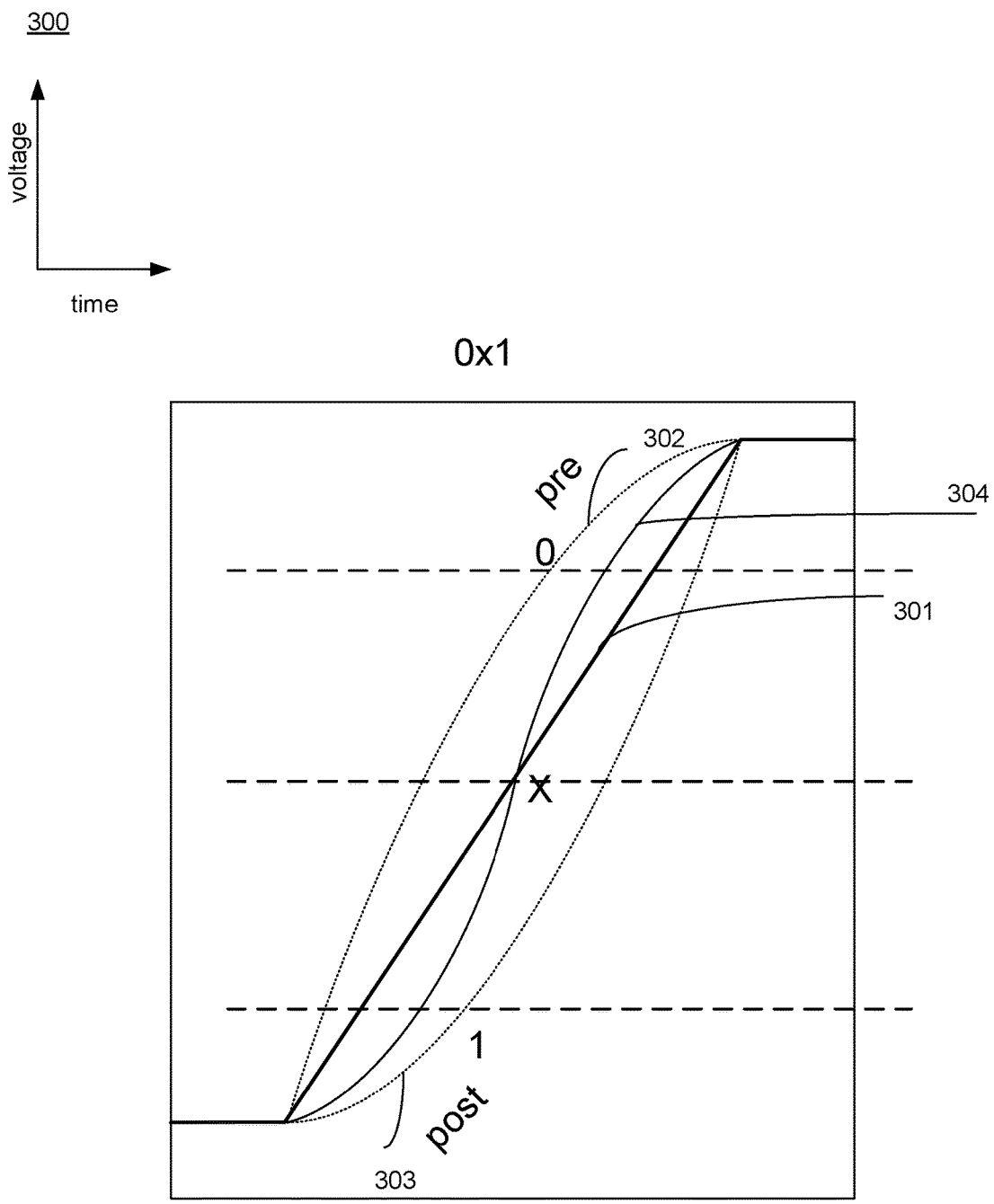
FIG. 3 is a closed non-lone bit transition.

FIGS. 2 and 3 illustrate closed lone bit transition and closed non-lone bit transition of input data, respectively, to describe operation of the embodiment of FIG. 1. It is pointed out that those elements of FIGS. 2 and 3 having the same reference numbers (or names) as the elements of any other figure can operate or function in any manner similar to that described, but are not limited to such.

FIG. 2 shows a plot 200 with a single lone bit (010) pattern 201. The x-axis is time and y-axis is voltage. Lone bit pattern, in the context of this disclosure, occurs when adjacent bits of the input signal are the same (or equal) but not equal to the current bit. Another lone bit pattern is 101. In plot 200, the pre-cursor interference is 202 which is pulling the signal low while the post-cursor interference is 203 is also pulling the signal low. Signal 204 is the resultant lone bit (LB) from these two additive error sources.

The three horizontal dashed lines indicate the thresholds (reference voltages) of the error sampler 105, data sampler 104, and error sampler 106 from top to bottom, respectively. The error samplers 105 and 106 are re-purposed as uDFE offset samplers, according to one embodiment.

FIG. 3 shows a plot 300 of a closed non-lone bit transition of input data. In plot 300, N+1 bit is opposite in sign of the N−1 bit. Examples of non-lone bit patterns include 0x1, 1x0, where 'x' is either 0 or 1. In this plot, non-lone bit transition is shown by 301, pre-cursor ISI is 302, post-cursor ISI is 303, and 304 is the resultant signal when the post cursor ISI is forced equal and opposite to the precursor ISI as described with reference to the embodiments.

In this example, a non-lone bit transitions from 0 to 'x' to 1, where the transition is very near the center of the eye (i.e., closed eye). In this example, the previous bit is 0, the next bit is 1, and the middle bit is in the indeterminate region defined by upper and lower offset sampler offsets such that dp[n] resolves to a 0, dn[n] resolves to a 1, and d[n] is unknown or 'x.' The apparatus of FIG. 1A decides if this middle bit is supposed to be 0 or 1. If there is residual post-cursor ISI 303, it may be fair to assume that current bit is trying to move away from the 0 and favor 1. However, if there is residual pre-cursor ISI 302, it may be fair to assume that the next 1 is preventing good reception of 0 and favor 0. The embodiment of FIG. 1A makes the residual pre-cursor ISI equal to the residual post-cursor ISI. In this condition the pre-cursor and post-cursor ISIs cancel each other. In this embodiment, zero offset sampler 104 is used to decide the state of the bit favoring neither 0 nor 1.

In one embodiment, by applying the right amount of linear equalization to LE 103, a condition is established where the residual tap coefficients for N+1 (post-cursor) and N−1 (pre-cursor) are substantially equal in magnitude. In this condition, the pre-cursor error cancels the post cursor error for non-lone bit transitions and no further equalization may be needed for these taps. Furthermore, in this condition, the N+2 tap is also dramatically reduced eliminating the need for any targeted DFE for that tap.

Figure 4:
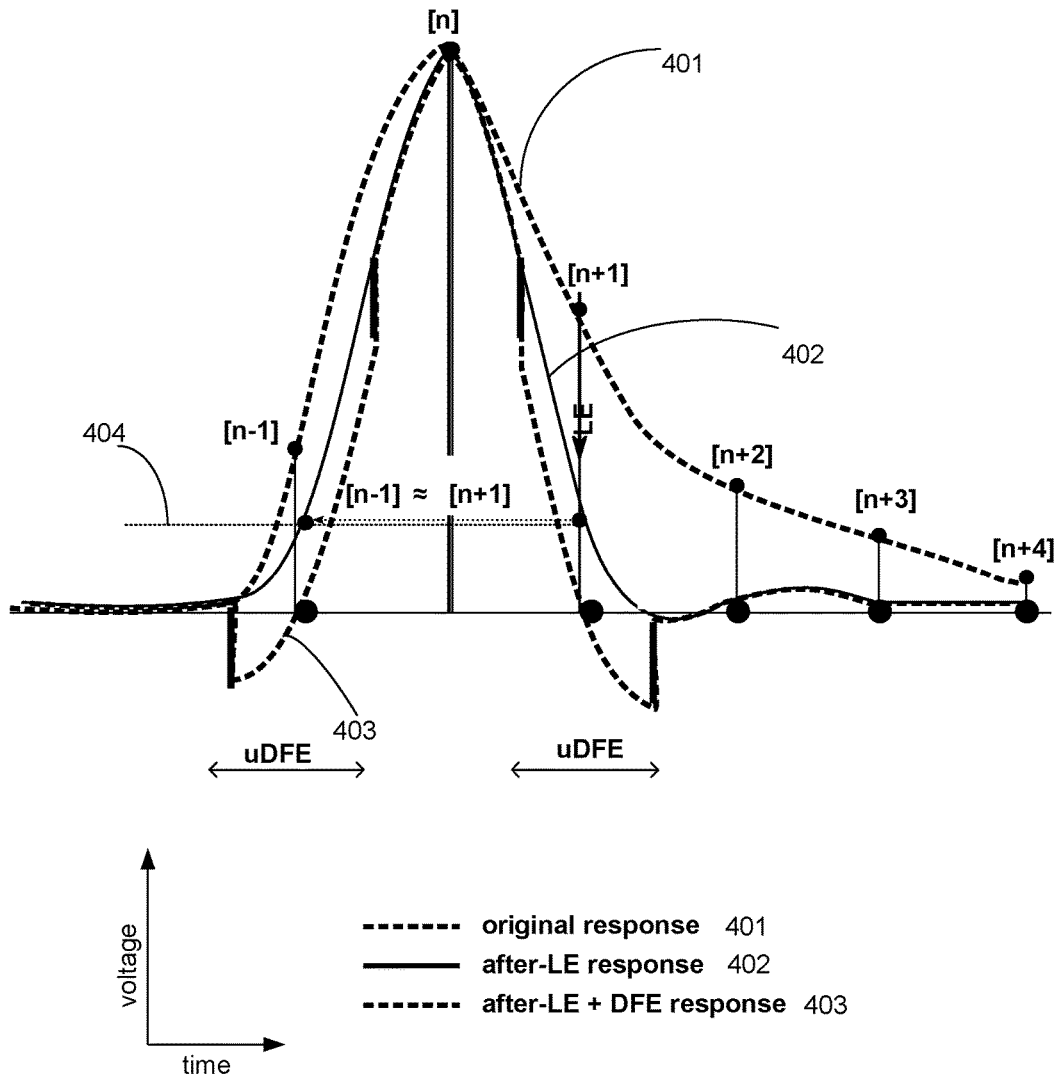
FIG. 4 illustrates pulse responses of the equalizer to match a first post-cursor residual Inter Symbol Interference (ISI) tap to a first pre-cursor residual ISI tap for a non-lone bit transition of the input signal, and after applying unrolled Decision Feedback Equalization (uDFE), according to one embodiment of the disclosure.

FIG. 4 are pulse responses 400 of the equalizer of FIG. 1 before and after matching first post-cursor ISI tap to a first pre-cursor ISI tap for a non-lone bit transition of the input signal, and after applying uDFE, according to one embodiment of the disclosure. It is pointed out that those elements of FIG. 4 having the same reference numbers (or names) as the elements of any other figure can operate or function in any manner similar to that described, but are not limited to such.

The x-axis is time and y-axis is voltage. The shaded circles are tap points including N−1 tap (pre-cursor tap), and post-cursor taps N+1 and N+2. The grey dash curve 401 is the channel pulse response when no LE and DFE is applied. In this case, the pre-cursor and post-cursor taps are non-zero resulting in worst case ISI.

In one embodiment, a simple logic function (inside Logic 116) may be used to identify lone bits to look at the previous bit (which, incidentally, is equal to the following bit for lone-bits) and to select one of the offset error samplers 105 and 106 in uDFE fashion. In this embodiment, the uDFE function is modified to select the offset samplers 105 and 106 for the lone bits only, that is, when d[n−1]==d[n+1] and to select the zero offset sampler 104 otherwise (i.e., for non-lone bit transitions). In one embodiment, offsets of offset sampler (105 and/or 106), then, can be set equal to the sum of the residual pre and post cursor taps. One technical effect of the embodiments is that N+1 and N−1 taps can be driven to zero (or substantially zero) and the N+2 to near zero for all traffic on the channel.

The solid curve 402 is the pulse response when LE 102 is optimized to a setting such that a first post-cursor residual ISI tap (i.e., N+1 tap) is matched to a first pre-cursor residual ISI tap (i.e., N−1 tap) for a non-lone bit transition of the input signal. The horizontal line 404 shows the matching of N−1 tap and N+1 tap. After matching N−1 tap and N+1 tap, other post-cursor taps get substantially close to zero. The other dashed curve 403 is the pulse response after applying the modified (lone bit only) DFE. The pulse response of dashed curve 403 shows that pre-cursor and post-cursor taps are now substantially zero.

The following embodiments describe the scheme of training LE 103 to automatically select the optimal linear equalization setting for the embodiment of FIG. 1. In one embodiment, receiver 100 of FIG. 1 utilizes pre-existing error samplers (in any receiver) in a modified uDFE configuration which targets only lone bits. In one embodiment, linear equalization setting is optimized via a modified Least Mean Square (LMS) error function such that the N−1, N+1, and N+2 taps are all minimized for non-lone bit patterns. The embodiments perform superiorly over full 4-tap with linear equalization topologies with lower power and area.

Figure 5:
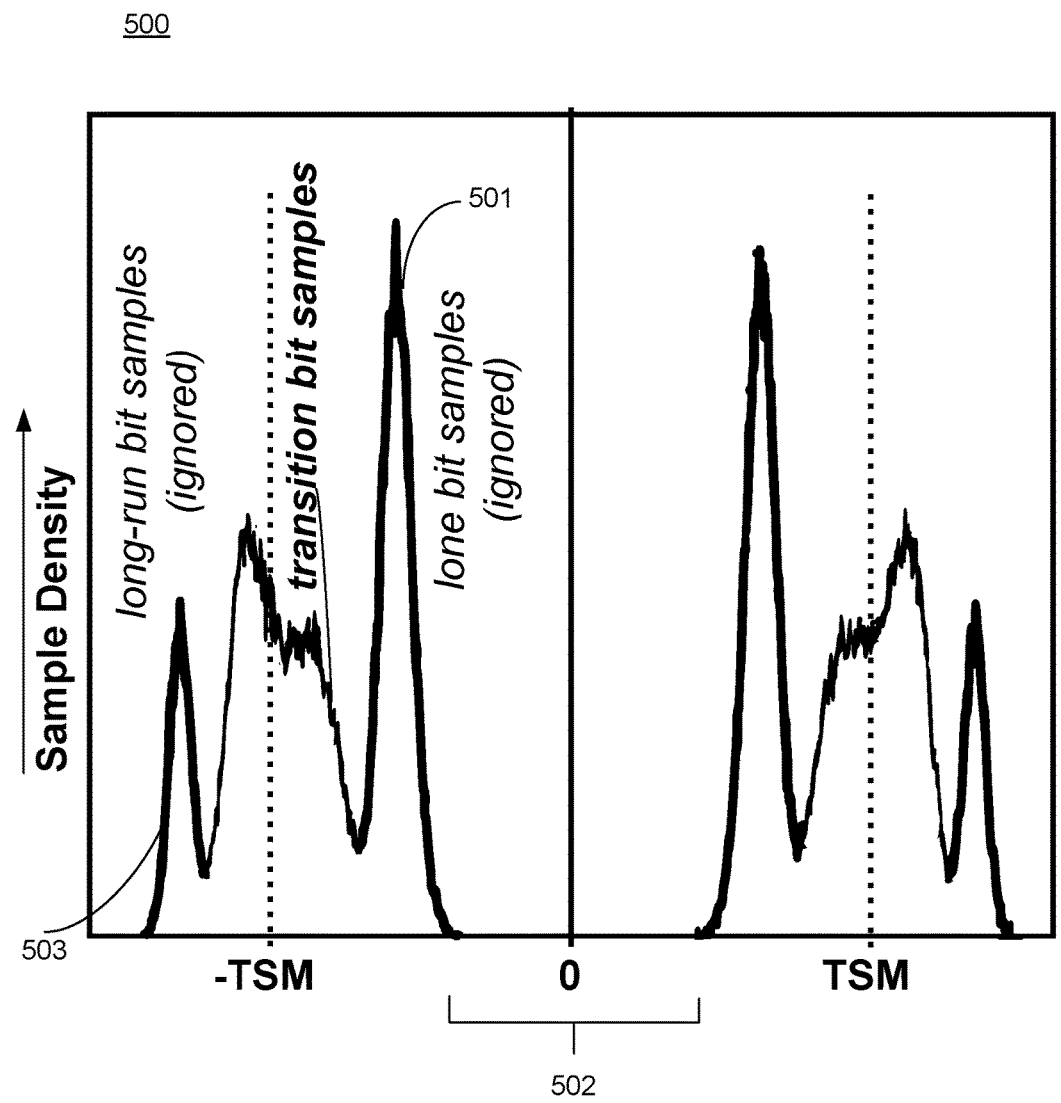
FIG. 5 is a distribution of data sample magnitudes around TSM (Target Signal Magnitude) showing the eye height after completing LE (Linear Equalizer) training, according to one embodiment.

FIG. 5 is an exemplary distribution 500 of data samples around TSM (Trained Signal Magnitude) including eye height opening 502 after completing training for LE 103, according to one embodiment. It is pointed out that those elements of FIG. 5 having the same reference numbers (or names) as the elements of any other figure can operate or function in any manner similar to that described, but are not limited to such.

In one embodiment, uDFE is trained after LE training is complete. After LE training is complete, distribution similar to distribution 500 is observed. In this example, the transition bits are moved to the TSM since lone bit (010 or 101) and long-run bits (000 & 111) are ignored i.e., lone bits and long-run bits are both ignored in LE training. In one embodiment, TSM is the target eye opening established by the offset applied to the error samplers 105 and 106. In this embodiment, gain of amplifier 102 and LE 103 are adjusted such that the transitions bits are centered around the TSM. The x-axis is sample magnitude and y-axis is number of samples.

In this plot, the vertical dashed lines are thresholds for TSM, the light shaded region are the ignored lone bits 501 and ignored long-run bits 503. The gap (502) in the center is the eye height. In one embodiment, TSM is +/−125 mV. In other embodiments, other threshold levels may be used for TSM In one embodiment, LMS training algorithm is used by LE 103 to meet the requirement of N+1==N−1. In one embodiment, LE 103 is made to meet the requirement of N+1==N−1 by omitting lone bit and long-run data from LMS engine. In such an embodiment, only data where the previous bit is opposite the following bit, i.e., a transition bit, is observed so the optimal setting for LE 103 is where N+1 is equal to N−1 so they cancel each other.

In one embodiment, the modified training routine as applied to receiver 100 has a sign-sign LMS engine at its core. In this embodiment, LMS engine used by LE 103 is different from traditional LMS scheme in that the error functions are different. In one embodiment, only transition bits (i.e., 1X0 and 0X1) are accounted for by the LMS algorithm whereas lone bits (i.e. 010 and 101) and long-run (i.e. 111 and 000) patterns are ignored. In one embodiment, training of amplifier 102 aims at setting the average sample height to a predetermined target defined as the offset reference of error samplers 105 and 106. In one embodiment, the error function to train the amplifier 102 is d[n]×e[n], creating two error zones in the slicer levels: larger or smaller than the TSM for the current sample independent of any prior or following samples. In one embodiment, gain of amplifier 102 and equalization of LE 103 converges to a setting that provides an average sample height equal to the TSM.

In one embodiment, the error function used to train the LE 103 is d[n−1]×e[n] when d[n−1] is not equal to d[n+1], creating two error zones in the slicer levels larger or smaller than TSM for transition bits. In one embodiment, the modified error provides an optimal pulse response behavior by restricting the valid observation window to only those transition bits where adjacent bits on either side of the current bit are not identical (i.e., transition bit d[n] where d[n+1]≠d[n−1]). In this embodiment, the error on such a bit has opposite pre- and first post-cursor contributions, alongside the other cursors. In this embodiment, the LMS engine—now dealing with the modified error function entries and trying to reduce the mean error—converges to equalization settings that provide similar pre and post cursor magnitudes.

In one embodiment, receiver 100 includes logic 117 to train LE 103 by modifying error function of LE 103 to ignore data when two adjacent bits of the input signal are the same, which includes lone bits and long-run bits. In one embodiment, the logic to train LE 103 trains LE 103 before tuning offset of offset samplers. In one embodiment, the logic to train LE 103 trains LE 103 simultaneously with tuning offset of offset samplers.

In one embodiment, after training amplifier 102 and LE 103 with error sampler reference at the target signal magnitude (i.e., TSM), the reference of error samplers 105 and 106 are adapted in response to a screened data pattern, which comprises of lone bits only. For screened data pattern, initially all samples may show that the error is lower than the reference. The reference of error samplers 105 and 106 is then decreased until the reference converges on the average magnitude of the lone-bit samples. At this level, the reference is offset from the original TSM by the combined ISI of N+1 and N−1 and settles to the average magnitude of lone bit samples' distribution, $V_{LB}$. In one embodiment, each of the N+1 or N−1 tap coefficient is approximately (TSM−$V_{LB}$)/2, by virtue of the LE training making pre-cursor and post-cursor equal. To correct for the combined effect, the reference offset to be used by the modified uDFE is then set at (TSM−$V_{LB}$).

Figure 6:
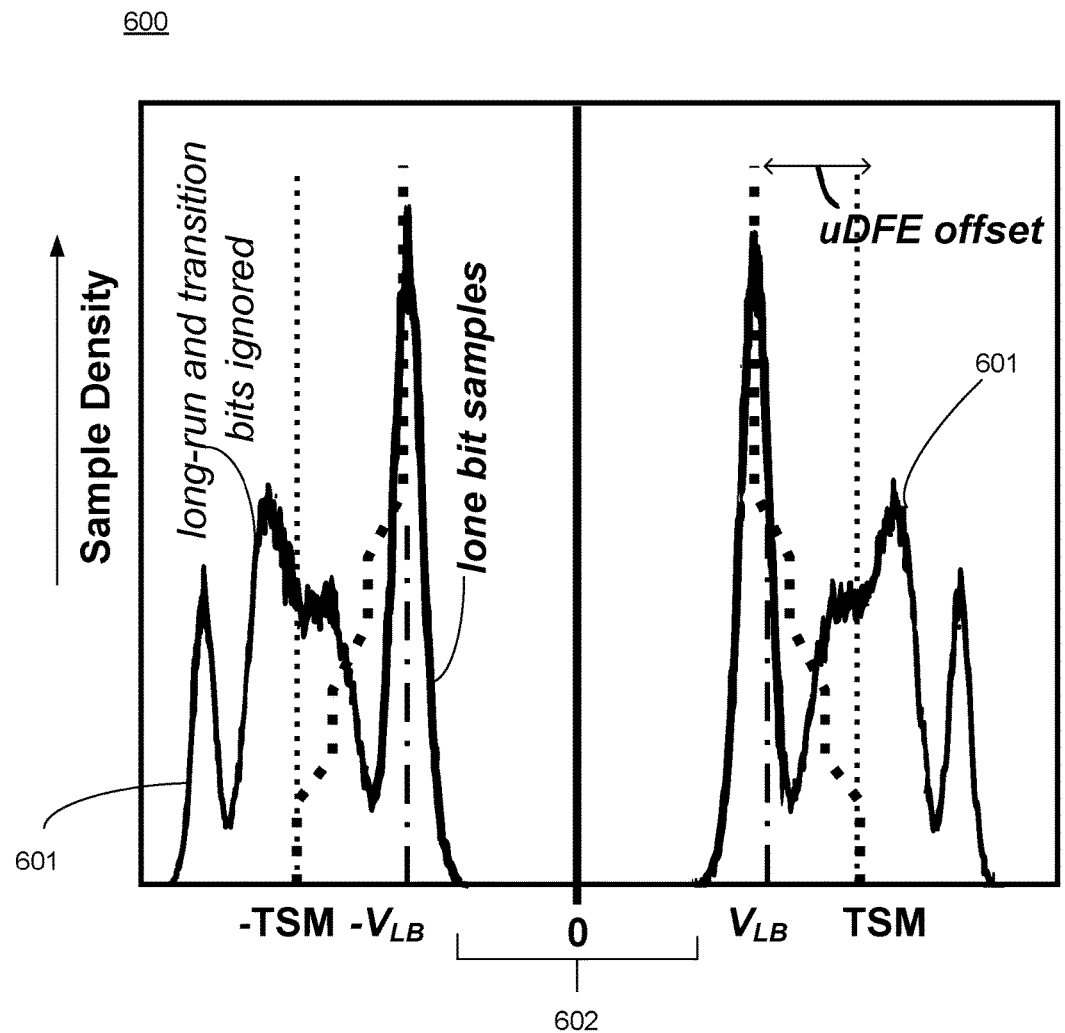
FIG. 6 is a distribution of bits around TSM including eye width and height after completing uDFE tap training following the LE training, according to one embodiment.

FIG. 6 is a distribution 600 of bits around TSM including eye width and height after completing LE and uDFE training, according to one embodiment. The x-axis is sample magnitude and y-axis is number of samples. In this plot, the vertical dashed lines are thresholds for TSM, the light shaded region are the ignored regions 601, the dot-dash lines are represent the trained reference values after uDFE training (i.e. $V_{LB}$), and the gap (602) in the center is the eye height opening during DFE training.

In one embodiment, LE training is performed first, which gives the distribution of FIG. 5, then uDFE tap training starts, moving the reference offset towards the lone bits. In one embodiment, to train uDFE, all bits 601 are ignored leaving the lone bits. In such an embodiment, LMS engine is used to drive the programmable offset of error samplers 105 and 106 to the center of the lone bit distribution, denoted as $V_{LB}$. In one embodiment, the reference level to error samplers (originally set at TSM for VGA and LE training) is made to equal (TSM−$V_{LB}$). $V_{LB}$ is the center of the lone-bit distribution. In one embodiment, when uDFE is enabled with this offset, the lone bits are pushed out to the TSM, and the long-run bits are pushed in towards the TSM.

Figure 7:
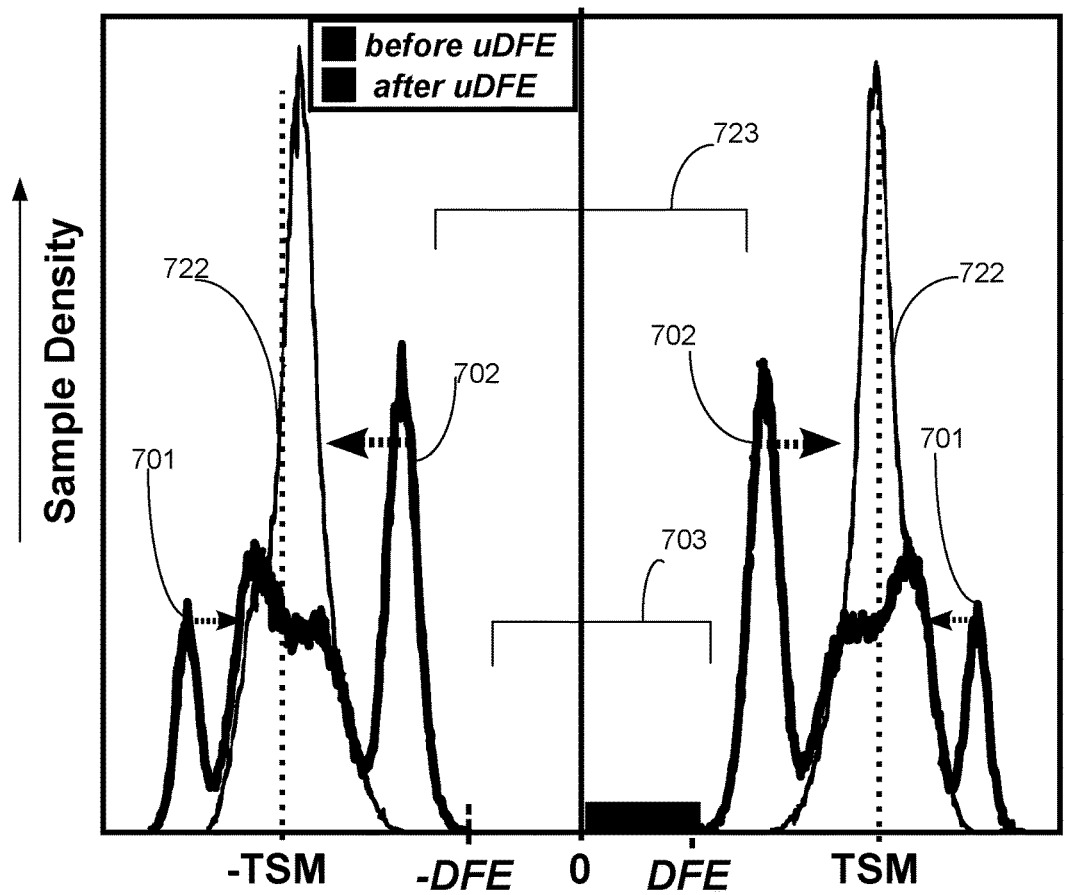
FIG. 7 is a plot with a side by side comparison of distribution of bits around TSM including eye height before and after completing LE and uDFE, according to one embodiment.

FIG. 7 is a plot 700 showing side by side comparison of distribution of bits around TSM including eye height before and after applying the modified uDFE, according to one embodiment. It is pointed out that those elements of FIG. 7 having the same reference numbers (or names) as the elements of any other figure can operate or function in any manner similar to that described, but are not limited to such.

In plot 700, toggle patterns of lone bits see negative ISI and are less than TSM as shown by 702. Long-run bits see positive ISI and are greater than TSM as shown by 701. After uDFE of the embodiments, all samples are pushed towards the TSM (see 722) thus providing a larger eye height opening (see 723) than before (see 703).

Figure 8:
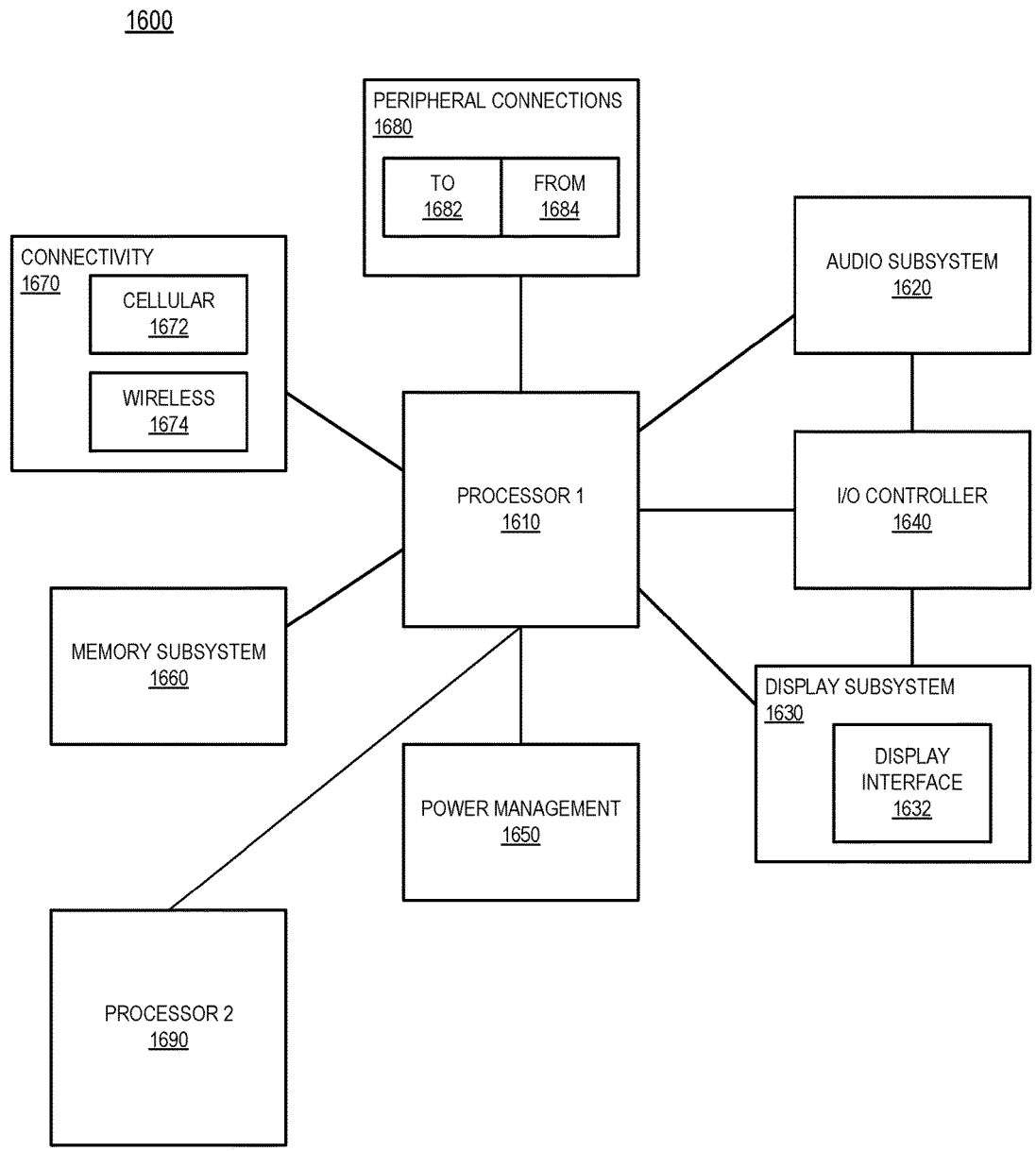
FIG. 8 is a smart device or a computer system or an SoC (system-on-chip) 1600 with the equalizer, according to one embodiment of the disclosure.

FIG. 8 is a smart device or a computer system or an SoC (system-on-chip) 1600 with an equalizer, according to one embodiment of the disclosure. It is pointed out that those elements of FIG. 8 having the same reference numbers (or names) as the elements of any other figure can operate or function in any manner similar to that described, but are not limited to such.

FIG. 8 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with the equalizer, according to the embodiments discussed. Other blocks of the computing device 1600 may also include the equalizer discussed in the embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment, apparatus comprises a pad to receive an input signal; an electro-static discharge (ESD) unit coupled to a pad; and a linear equalizer (LE) operable to match a first post-cursor residual ISI tap to a first pre-cursor residual ISI tap for a non-lone bit transition of the input signal. In one embodiment, apparatus further comprises: samplers, coupled to the LE, operable to perform LE equalization training and a function of an un-rolled decision feedback equalizer (DFE).

In one embodiment, the samplers include: offset samplers; and a non-offset sampler. In one embodiment, apparatus further comprises logic to select output of the offset samplers when two adjacent bits of the input signal are the same. In one embodiment, apparatus further comprises logic to select output of the non-offset sampler when two adjacent bits of the input signal are different. In one embodiment, apparatus further comprises logic to set offset of offset samplers to a sum of the first post-cursor residual ISI tap and the first pre-cursor residual ISI tap.

In one embodiment, apparatus further comprises logic to tune offset of the offset samplers to maximize signal integrity of the received input signal. In one embodiment, apparatus further comprises logic to train the LE. In one embodiment, the logic to train the LE by modifying an error function of the LE to ignore data when two adjacent bits of the input signal are the same. In one embodiment, the logic to train LE trains the LE before tuning offset of offset samplers. In one embodiment, the logic to train LE trains the LE simultaneously with tuning offset of offset samplers.

In another example, an apparatus comprises: samplers operable to perform linear equalization training and to perform function of an un-rolled decision feedback equalizer (DFE); and logic to select output of offset samplers, from among the samplers, when two adjacent bits of an input signal are the same. In one embodiment, apparatus further comprises: a linear equalizer (LE) operable to match a first post-cursor residual ISI tap to a first pre-cursor residual ISI tap for a non-lone bit transition of the input signal.

In one embodiment, apparatus further comprises logic to train the LE. In one embodiment, the logic to train LE trains the LE before tuning offset of offset samplers, wherein the offset samplers are part samplers. In one embodiment, the logic to train LE trains the LE simultaneously with tuning offset of offset samplers. In one embodiment, further comprises logic to select output of a non-offset sampler, from among the samplers, when two adjacent bits of the input signal are different.

In another example, in one embodiment, a system comprises: memory unit; a processor coupled to the memory unit, the processor including a receiver, the receiver comprising: a pad to receive an input signal; an electro-static discharge (ESD) unit coupled to a pad; and a linear equalizer (LE) operable to match a first post-cursor residual ISI tap to a first pre-cursor residual ISI tap for a non-lone bit transition of the input signal; and a wireless interface for allowing the processor to communicate with another device.

In one embodiment, the system further comprises a display unit. In one embodiment, samplers, coupled to the LE, operable to perform LE equalization training and a function of an un-rolled decision feedback equalizer (DFE), wherein the samplers include: offset samplers; and a non-offset sampler; first logic to select output of the offset samplers when two adjacent bits of the input signal are the same; and second logic to select output of the non-offset sampler when two adjacent bits of the input signal are different. In one embodiment, the system includes the apparatus discussed in various embodiments.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. A decision feedback equalizer (DFE), comprising:
a pad to receive an input signal;
an electro-static discharge (ESD) unit coupled to the pad;
a linear equalizer (LE) coupled downstream from the ESD unit and pad to process the input signal;
samplers including offset samplers and a non-offset sampler coupled downstream from the LE;
a first multiplexer having respective inputs preceded by respective latch circuits positioned downstream from the samplers, the respective inputs to receive different sampled versions of a current signal [n], the respective latch circuits to receive different sampled versions of a next signal [n+1], the multiplexer having an output coupled to another latch circuit that is to provide a prior signal [n−1];
a second multiplexer having an output coupled to the first multiplexer's channel select input, the second multiplexer having inputs to receive the next signal, the prior signal and a signal that causes the first multiplexer to select a sampled version of a current signal that originates from an offset sampler when the next and prior signals are the same.

2. The DFE of claim 1 wherein the DFE is to perform an un-rolled decision feedback equalization function.
3. The DFE of claim 1 wherein the second multiplexer is to cause the first multiplexer to select a sampled version of a current signal that originates from the non-offset sampler when the next and prior signals are different.
4. The DFE of claim 1 further comprising logic to set an offset of the offset samplers to a sum of a first post-cursor residual ISI tap and a first pre-cursor residual ISI tap.
5. The DFE of claim 1 further comprising logic to tune an offset of the offset samplers to maximize signal integrity of the input signal.
6. The DFE of claim 1 further comprising logic to train the LE.
7. The DFE of claim 6, wherein the logic to train the LE is to modify an error function of the LE to ignore data when two adjacent bits of an input signal bit are the same.
8. The DFE of claim 1, wherein the logic to train the LE is to train the LE before tuning respective offsets of the offset samplers.
9. The DFE of claim 1, wherein the logic to train the LE is to train the LE simultaneously with tuning respective offsets of the offset samplers.
10. An apparatus comprising:
an un-rolled decision feedback equalizer (DFE), comprising:
samplers including offset samplers and a non-offset sampler; and
logic circuitry to select respective outputs from amongst the offset samplers such that:
an output from an offset sampler is selected when two adjacent bits of an input signal are the same;
an output from the non-offset sampler is selected when two adjacent bits of an input signal bit are different, wherein the selection of the output from the non-offset sampler is made with a previous signal bit or a past signal bit depending on a mode of the DFE.
11. The apparatus of claim 10, further comprising a linear equalizer (LE) to pre-process the input signal.
12. The apparatus of claim 11 further comprising logic to train the LE.
13. The apparatus of claim 12, wherein the logic to train the LE is to train the LE before tuning the offset samplers.
14. The apparatus of claim 13, wherein the logic to train the LE is to train the LE simultaneously with tuning an offset of the offset samplers.
15. A system comprising:
a) memory unit;
b) a processor coupled to the memory unit, the processor decision feedback equalizer (DFE) including a comprising:
a pad to receive an input signal;
an electro-static discharge (ESD) unit coupled to the pad;
linear equalizer (LE) coupled from the ESD unit and pad to process the input signal;
samplers including offset samplers and a non-offset sampler coupled downstream from the LE;
a first multiplexer having respective inputs preceded by respective latch circuits positioned downstream from the samplers, the respective inputs to receive different sampled versions of a current signal [n], the respective latch circuits to receive different sampled versions of a next signal [n+1], the multiplexer having an output coupled to another latch circuit that is to provide a prior signal [n−1];

a second multiplexer having an output coupled to the first multiplexer's channel select input, the second multiplexer having inputs to receive the next signal, the prior signal and a signal that causes the first multiplexer to select a sampled version of a current signal that originates from an offset sampler when the next and prior signals are the same;

c) a wireless interface for allowing the processor to communicate with another device.

16. The system of claim 15 further comprising a display unit.

17. The system of claim 15, wherein the DFE is to perform an un-rolled decision feedback equalizer (DFE) function.

* * * * *